I. L. Blanchard.
Steering.

Nº 5,284.                    Patented Sept. 11, 1847.

UNITED STATES PATENT OFFICE.

ISAAC L. BLANCHARD, OF WEYMOUTH, MASSACHUSETTS.

STEERING APPARATUS FOR VESSELS.

Specification of Letters Patent No. 5,284, dated September 11, 1847.

*To all whom it may concern:*

Be it known that I, ISAAC L. BLANCHARD, of Weymouth, in the county of Norfolk and State of Massachusetts, have invented a new and useful Improved Storing Apparatus for Vessels; and I do hereby declare that the same is truly described and represented in the following specification and accompanying drawings, letters, figures, and references thereof.

Figure 2:
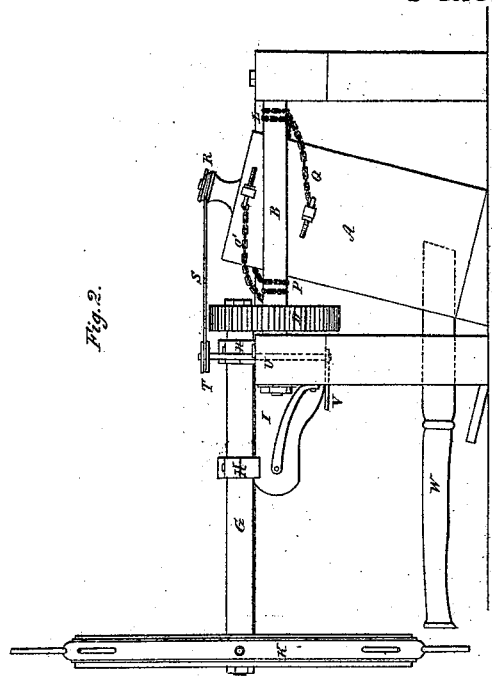
Figure 1:
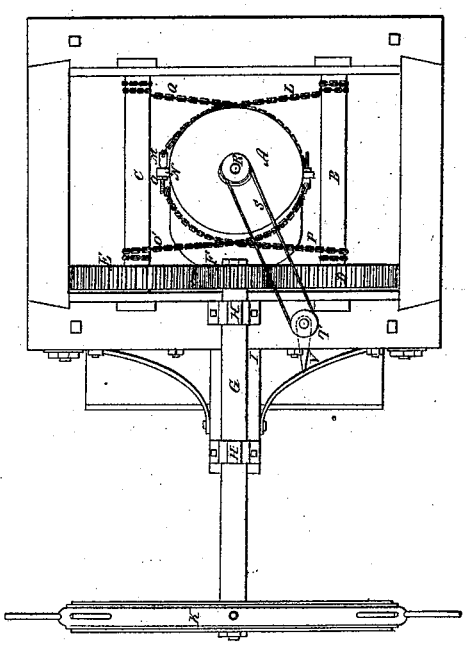

In said drawings, Figure 1 represents a top view of my said steering machinery, as applied to the head of a rudder of a vessel. Fig. 2 is a side elevation of it.

In said drawings A, exhibits the head or upper part of a rudder, B, and C, are two windlasses, or shafts, arranged with respect to the said rudder head and one another as seen in the drawings. Each of said windlasses has a cogged wheel D or E, affixed on it both of said cogged wheels being made to engage with a cogged pinion F, placed on one end of a wheel shaft G, sustained in bearings H, H, resting on the frame I. A common purchase wheel K, is placed on the other end of the shaft G. L is a chain one end of which is attached to the rudder head by a shackle bolt M, which passes through a projection N—the said projection being arranged in the position on the rudder head as seen in the drawings, and has a screw cut on it and a nut O screwed on it as seen in Fig. 1. The other end of the said chain is fastened to the windlass barrel or shaft, B. Another chain O′, is similarly connected to the rudder head, on the opposite side of it the said chain being carried partly around the front of the rudder head and is fastened at its other end to the windlass C. Two other chains P, Q, are also respectively fastened to the rudder head in the same manner as those first described, and cross one another on the rear side of the rudder head, and from thence are respectively connected or fastened to the windlasses B, and C. By taking hold of the handles of the purchase wheel K, and revolving it, the shaft G, and other mechanism, will be put in motion in such a manner as to cause a partial rotation of the rudder head and rudder. Reversing the motion of the purchase wheel, will reverse that of the rudder. On the top of the rudder head I affix a small horizontal or slightly inclined pulley R. On the periphery of this pulley I place an endless belt or band S, which I also cause to embrace another grooved pulley T, arranged on the upper end or any other proper part of a vertical shaft U, arranged in proper supports or bearings so as to admit of horizontal rotation, both in one direction and in the opposite. A small index pointer or arrow V, is made to project horizontally from this shaft and so as to be in full view of the helmsman. It is so arranged that a line passing through it centrally and longitudinally shall be parallel to a line made to pass centrally and longitudinally through the tiller W; the object of the said index being to indicate the position of the rudder or tiller when the latter is removed from the said rudder. The slack of the chains may be taken up by the screw and nut of their connections with the rudder head; and that part of the rudder head around which they operate may be protected from wear by an iron collar or in any other proper manner.

My improvement besides offering great power to the helmsman to operate the rudder, does not possess the rigidity of many other kinds of steering apparatuses by which when a heavy sea strikes the rudder they are liable to be and often are broken or damaged. It is simple and if out of order can be easily repaired. If a chain should break, a rope may be substituted for it until it can be mended. Hide or other ropes may be substituted for chains but I consider the chains to be more economical so far as wear is concerned.

What I claim as my invention is—

The combination of chains, two windlass barrels, cogged wheels, and purchase wheels and shaft as applied to the rudder head in manner and for the purpose as specified. I further claim the combination of the index pointer or apparatus, with the rudder head, for the purpose of denoting the direction of the rudder when the tiller is removed—all as specified.

In testimony whereof I have hereto set my signature this twenty-sixth day of March A. D. 1847.

ISAAC L. BLANCHARD.

Witnesses:
THOMAS S. ELLIS,
A. S. WHITE.